United States Patent [19]
Boyer

[11] 4,367,721
[45] Jan. 11, 1983

[54] SIGNAL DETECTION CIRCUIT WITH SELF-ADJUSTING THRESHOLD HAVING MODULATED CARRIER INPUT

[75] Inventor: Wesley D. Boyer, Dearborn Heights, Mich.

[73] Assignee: Ford Motor Company, Dearborn, Mich.

[21] Appl. No.: 198,890

[22] Filed: Oct. 20, 1980

Related U.S. Application Data

[63] Continuation-in-part of Ser. No. 64,699, Aug. 8, 1979, Pat. No. 4,293,814.

[51] Int. Cl.³ .............................................. F02P 1/00
[52] U.S. Cl. ............................ 123/617; 123/146.5 A; 123/618
[58] Field of Search ............... 123/617, 618, 612, 613, 123/146.5 A

[56] References Cited

U.S. PATENT DOCUMENTS

| | | | |
|---|---|---|---|
| 3,923,030 | 12/1975 | Luteran | 123/617 |
| 4,014,308 | 3/1977 | Schweitzer | 123/617 |
| 4,293,814 | 10/1981 | Boyer | 123/612 |

FOREIGN PATENT DOCUMENTS 53-34029  3/1978  Japan .................................. 123/617

Primary Examiner—P. S. Lall
Attorney, Agent, or Firm—Paul K. Godwin, Jr.; Clifford L. Sadler

[57] ABSTRACT

An amplifier circuit for use with variable inductance type position sensors and others which provide modulated carrier outputs, whereby the circuit is conditioned by the cyclical modulation output from the sensor. The circuit condition sets a threshold level based upon the signal output from the sensor so that the signal from the circuit is a voltage replica of the input signal that is enhanced to have predetermined and constant high and low peak values without regard to peak value variations in the cyclical signal received from the sensor.

6 Claims, 5 Drawing Figures

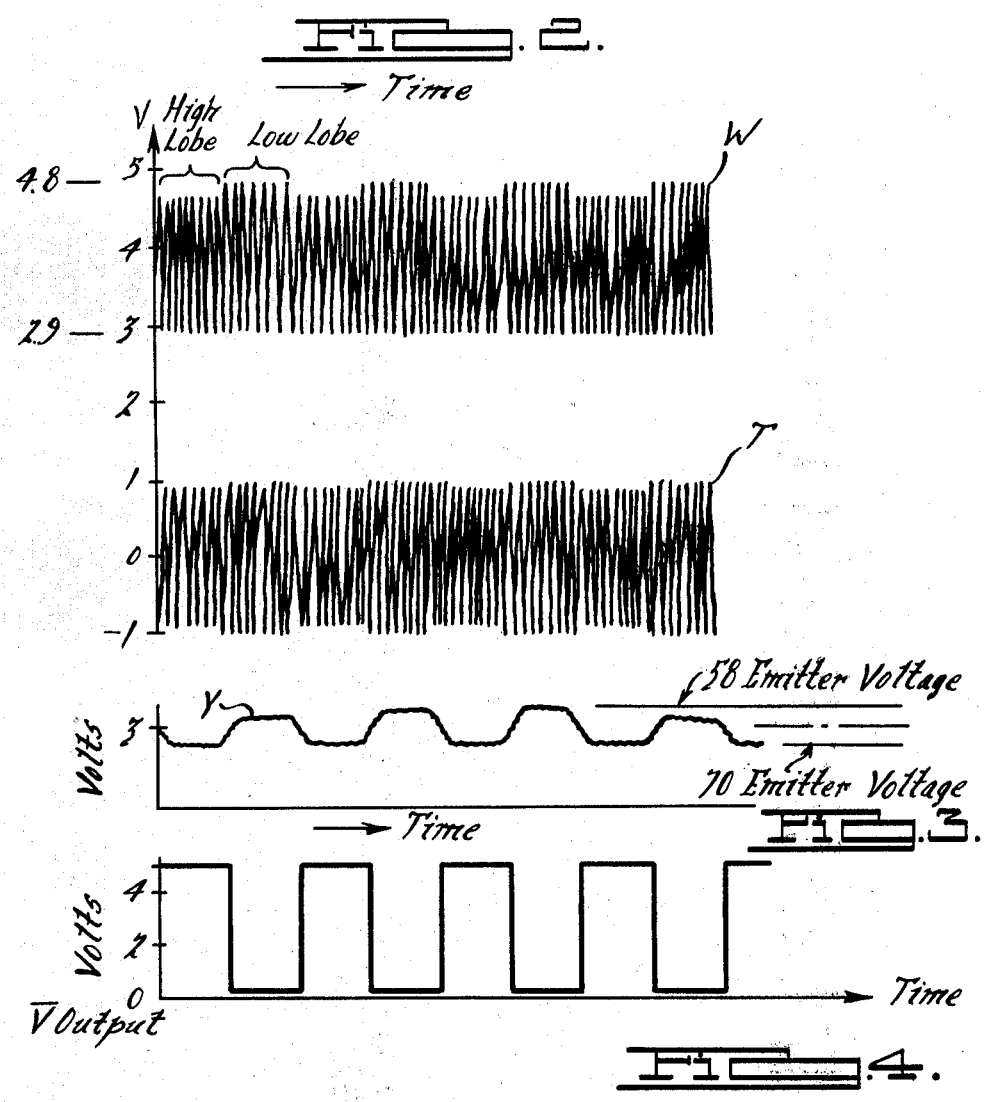
FIG. 2.
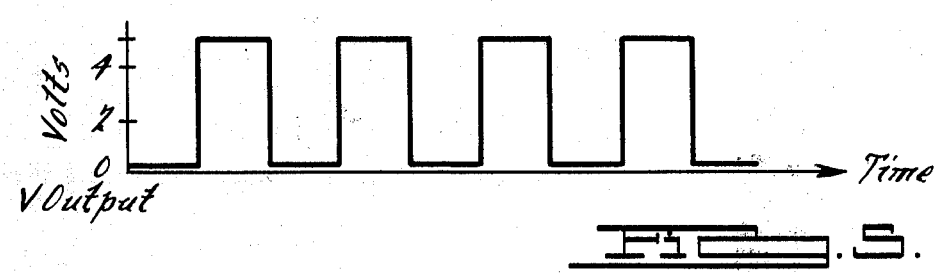
FIG. 3.
FIG. 4.
FIG. 5.

SIGNAL DETECTION CIRCUIT WITH SELF-ADJUSTING THRESHOLD HAVING MODULATED CARRIER INPUT

CROSS REFERENCE TO RELATED APPLICATION

The present application is a continuation-in-part of my copending U.S. patent application Ser. No. 64,699, filed Aug. 8, 1979 and entitled "Signal Condition Detection Circuit with Self-Adjusting Threshold", now U.S. Pat. No. 4,293,814.

BACKGROUND OF THE INVENTION

1. Field of the Invention

The present invention is related to ignition systems for internal combustion engines and more specifically to amplifier circuits used in conjunction with engine speed crankshaft position sensors.

2. Description of the Prior Art

Over the past several years there has been a tendency in the automotive field to eliminate conventional mechanical breaker systems which provided timing pulses to ignition systems that, in turn, supplied properly timed spark energy to the individual spark plugs of the engine. One of the more popular replcements for the standard mechanical breaker system is the Hall effect sensor in combination with a rotating ferrous shunting element attached to the distributor shaft or the crank shaft of the engine. The Hall effect sensor is electrically connected to a solid state amplifier to produce a pulsating voltage signal to the primary of an ignition coil.

A typical Hall effect sensor and associated circuit are shown in U.S. Pat. No. 3,875,920, whereby a multi-vaned shunt wheel is mounted in a distributor for rotation with the distributor shaft. As the shunt wheel is rotated, the individual ferrous shunting vanes rotate to a close proximity of the Hall effect sensor and a permanent magnet located next to the Hall effect sensor. The close proximity of any vane causes the magnetic field at the sensor to be reduced and thereby affect its electrical output signal. As the vane rotates past the Hall effect sensor, the magnetic field at the sensor increases and causes the electrical output signal from the sensor to increase. Therefore, a cyclical signal is generated by the Hall effect sensor, that has a frequency indicative of the speed at which the shunt wheel is rotating and synchronized with the wheel position. The amplifying circuit, as described in that patent, is used to drive a Schmitt trigger circuit when the output level of the Hall effect sensor rises above a fixed predetermined level. Similarly, when the signal from the Hall effect sensor passes below another fixed predetermined level, the output from the Schmitt trigger falls back to a low level.

Typically, the output of the Hall effect sensor is a cyclical signal having high and low peak values which are irregular and vary according to vane locations and from one sensor to another. In addition, the differential voltage derived from the Hall effect sensor provides an offset for the varying peak cyclical signal and this also may vary from sensor to sensor, depending upon the strength of the magnet, Hall voltage coefficient, and the value of the biasing voltage.

Variations in the peak to peak voltage are commonplace in Hall effect sensors, since the vaned shunt wheels, such as shown in U.S. Pat. No. 3,875,920 and discussed above, are not generally manufactured as high tolerance items. Therefore, a wheel may be eccentrically mounted on the shaft or may have vanes with slight bends in them which result in variations in spacing between the individual vanes and the Hall effect sensor as the shunt wheel is rotated about the shaft.

Hall effect sensors and various other types of sensors are described in paper no. 780207 entitled "A Worldwide Overview of Automotive Engine Control Sensor Technology" by William G. Wolber, pages 1-18 appearing in a Society of Automotive Engineers, Inc. publication SP-427 entitled "Automotive Applications of Sensors". Of those shown in the Wolber paper, a variable-inductance crankshaft-position sensor is one that is receiving more and more attention due to its capability of producing a static output signal. The variable inductance sensor employs a carrier frequency oscillator which is applied to a coil wound around a ferrite ring core positioned between one pole of a permanent magnet and a multilobed disc formed of a ferromagnetic material connected to the crankshaft of the engine. The position of the multilobed disc with respect to the ferrite core affects the inductance of the coil and therefore the impedance on the output of the oscillator. Whenever a high lobe of the disc rotates to a position adjacent the ferrite core, the magnetic flux field is influenced to reduce the inductance of the coil and the impedance at the output of the oscillator. A detector circuit is employed to demodulate the output of the oscillator. In order to utilize the variable inductance position sensor with prior art circuitry, it has been necessary to provide high quality control in manufacture and installation of those sensors so that the modulation signal output therefrom is always the same to insure proper ignition timing.

However, in high production manufacturing of variable inductance sensors, such quality control has been found to be excessively expensive and therefore such sensors have not been in popular usage. Variations in magnet strength, physical displacement with respect to the ferrite cores and composition thereof as well as variations in lobe heights on the disc and possible eccentricities produced by its mounting on the crankshaft, each affect the modulation signal and the resultant timing signals output from the detector circuit from sensor to sensor and from vehicle to vehicle.

SUMMARY OF THE INVENTION

It is an object of the present invention to overcome the problems in the prior art by providing a signal conditioning amplifier with a self-adjusting threshold, for use with a variable-inductance type position sensor.

It is another object of the present invention to produce stable cyclical output signals without regard to peak to peak variations in sensor modulation signals, the value of the steady state magnetic field, or the absolute value of the sensor modulation signals.

It is a further object of the present invention to provide a signal conditioning amplifier for use with a variable-inductance type position sensor wherein the output signal is an enhanced voltage replica of the profile of the rotating position wheel or disc having separate sections spaced at different lengths from the sensor as it rotates.

It is a further object of the present invention to provide a signal conditioning amplifier with a self-adjusting threshold whereby the input cyclical modulation signal having high and low peak values are respectively sampled and stored to derive a threshold level which is compared against the input cyclical modulation signal.

It is still a further object of the present invention to provide an amplifier which automatically adapts for replacement of like input signal devices and provides a predictable output signal voltage.

In the present invention, the aforementioned objects are achieved in the following manner. A variable inductance type position sensor is activated by a constant amplitude RF signal source and is positioned adjacent a ferrous actuating disc having a segmented high-low profile configuration. The rotation of the actuating disc produces cyclical variation in the air gap between the variable inductance sensor and the edge of the disc. The cyclical variation in the air gap results in an amplitude modulation of the RF signal applied to the sensor. The amplitude modulation affects both the negative and positive peaks on the RF signal envelope. The envelope of the amplitude modulated RF signal is then processed to extract the phasing information of the high/low transitions and output a rectangular wave signal which is an enhanced electrical replica of the profile of the extended segments of the actuating disc.

In processing the modulated RF envelope, a DC reference level is established as a base reference to locate the negative peaks of the modulated RF signal and to cause all modulation of the amplitude to appear on the positive peaks as approximately double that which originally appeared. Subsequently, the modulation signal is extracted from the positive peaks of the modulated RF signal by a peak envelope detector circuit. The demodulated signal is then sampled at its highest level and lowest level over several cycles of the actuating disc and a threshold is automatically set at a level defined as a predetermined portion of the range between the sampled minimum and maximum voltage levels. A bilevel output signal is then generated that changes between its two levels as the demodulated signal traverses the automatically set threshold reference level. The circuit output signals appear as complimentary square wave signals of constant peak amplitude levels.

BRIEF DESCRIPTION OF THE DRAWINGS

FIG. 2 shows various wave forms as monitored at designated points in the circuit illustrated in FIG. 1.

FIG. 3 illustrates the demodulated signal present at point "Y" in the circuit illustrated in FIG. 1.

FIG. 4 illustrates the V output signal from the circuit shown in FIG. 1.

FIG. 5 illustrates the V output signal from the circuit shown in FIG. 1.

DETAILED DESCRIPTION OF THE PREFERRED EMBODIMENT

Figure 1:
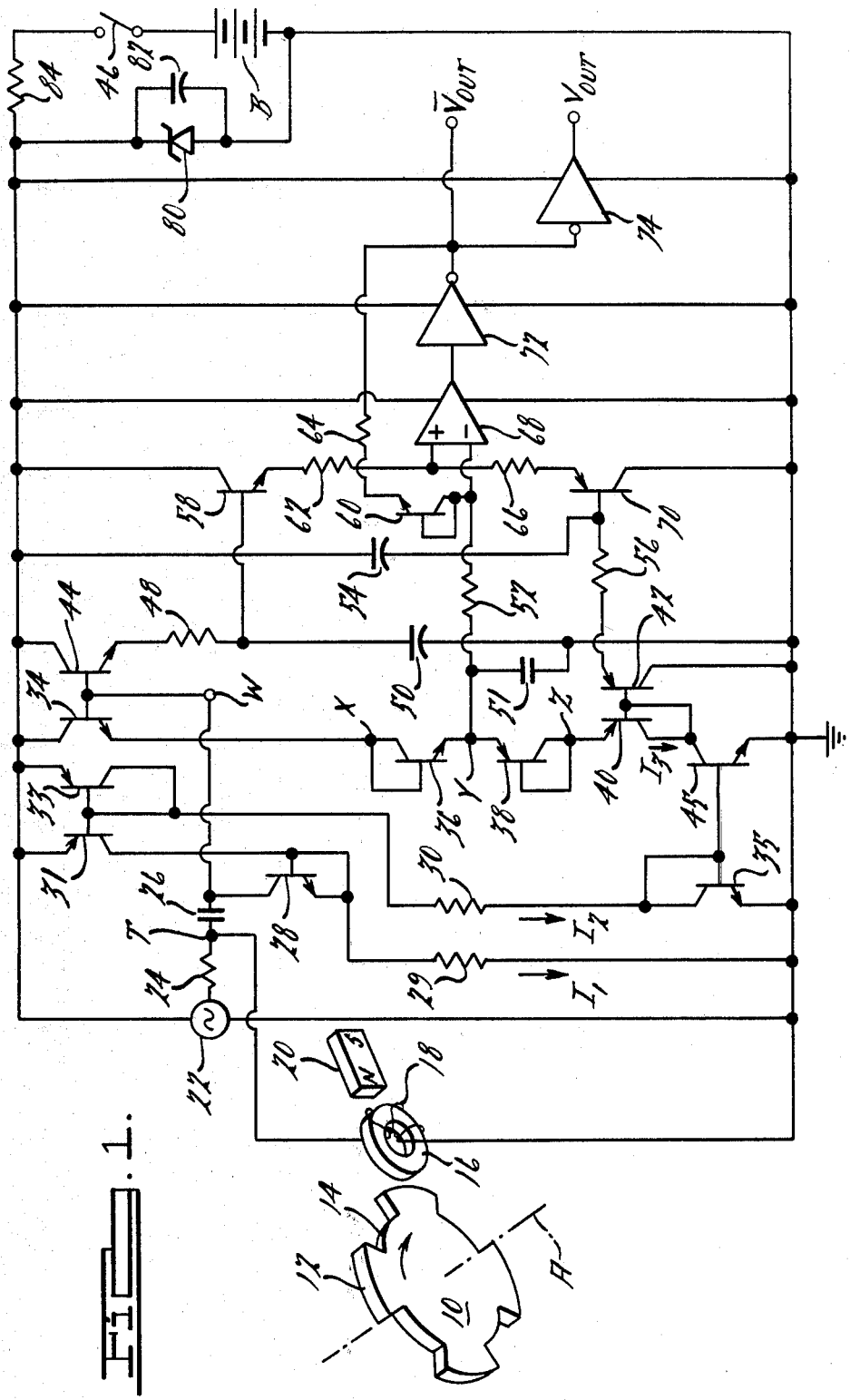
FIG. 1 is a schematic of the preferred embodiment of the invention.

A schematic of a circuit which embodies the present invention is shown in FIG. 1. That circuit receives energization from a DC power source designated as B and is controlled for on/off energization by a switch 46. A load resistor 84 in combination with a zener diode 80 and capacitor 82 provide a regulated 5 volts with high frequency filtering to the circuit.

A variable inductance type sensor is shown in FIG. 1 which comprises a ferrite core 16, a winding 18, a permanent magnet 20, having one pole thereof adjacent the winding 18, and a rotating ferromagnetic timing disc 10. The winding 18 is connected through an isolating resistor 24 to an RF oscillator 22, which produces a constant level RF signal to the resistor 24. The RF signal is supplied to the winding 18 at approximately 2 volts peak to peak with a frequency of approximately 500 KHz. The magnet 20 biases the core 16 with flux that links the core 16 to a rotating ferromagnetic timing disc 10. The timing disc 10, in the present embodiment, is rotated about an axis A and is preferably mounted on a crankshaft of a vehicle or the like in order to indicate the rotational orientation of that shaft. The timing disc 10 contains a series of lobes 12 which extend outward in an arc segment fashion separated by an equal arc segment of a shorter radius. The lobes 12 are rotated adjacent the ferrite core 16 so that a cyclically variable air gap will result as the disc 10 is rotated. The variable air gap affects the reluctance of the magnetic path and accordingly affects the impedance of the circuit at point T (a defined junction point between resistor 24 and winding 18). The voltage sustained at point T depends inversely upon the reluctance and/or degree of magnetic saturation of the ferrite core 16.

A lower amplitude peak to peak RF signal appears when the timing disc 10 rotates so that one of the lobes 12 is proximate to the ferrite core 16 and a larger amplitude peak to peak RF signal appears when the disc rotates to present a larger air gap between the ferrite core 16 and an arc segment 14. Hence, an amplitude modulated RF signal appears at point 2, as the timing disc 10 rotates; and the envelope of modulation is essentially a raw electrical duplicate of the profile of the disc as it appears from the ferrite core 16. This signal is typically illustrated as the lower waveform of FIG. 2, as it appears at point T in the circuit.

Subsequent processing of the modulated signal provides a DC reference for the lower peaks of the RF signal so that the peak to peak modulation at point T shows up as only an upper peak modulation that is double in value to any of the variations shown in the upper peaks at point T.

Referencing is performed by means of a current mirror source circuit. In that current mirror circuit, a diode-connected PNP transistor 33 has an emitter connected to the 5 volt DC voltage source and has its base/collector connected to a resistor 30. The other end of the resistor 30 is connected to the base/collector of a diode-connected NPN transistor 35, which has its emitter connected to ground. A current $I_2$ is established, flows through transistor 33, resistor 30 and transistor 35.

An adjacent PNP transistor 31 has its emitter connected to the 5 DC voltage source; base connected to the base/collector of transistor 33; and collector connected to a resistor 29. Resistor 29 is, in this instance, identical in value to resistor 30. A current of $I_1$ flows through transistor 31 and resistor 29, which is substantially equal to the current $I_2$ flowing through resistor 30.

The modulated RF signal at point T is through a capacitor 26 to a point W. The referencing of the signal is achieved at point W through a diode-connected (base shorted to emitter) NPN transistor 28. Transistor 28 has its collector connected to point W and its base/emitter connected to the junction between transistor 31 and resistor 29. Since resistors 29 and 30 are equal in value and $I_1$ is equal to $I_2$, substantially equal DC voltages appear across those resistors. The base/emitter of transistor 28 is therefore held at a DC voltage which is equal to the value of two diode voltage drops below the supply voltage due to the value of current $I_2$ in the adjacent reference current line. That is, 5 volts supply minus approximately 1.4 volts dropped across the diode-connected transistors 33 and 35 (0.7 volts per diode drop) results in a voltage of approximately 3.6 volts being dropped across resistors 30 and 29. In this embodiment, 3.6 volts appears at the base/emitter of transistor 28.

In operation, the DC voltages appearing across resistors 29 and 30 are held substantially equal in value, as determined by the current $I_2$. The base/emitter of transistor 28 is sustained at a DC voltage which is two diode drops below the supply voltage. That is, 5 volt supply minus approximately 1.4 volts (0.7 volts per diode drop across transistors 33 and 35) results in approximately 3.6 volts being dropped across resistor 30 which is equal to the voltage at the base/emitter of transistor 28 referenced from ground.

Since the voltage at the junction between the resistor 29 and the base/emitter of transistor 28 is approximately 3.6 volts, the minimum voltage present at the collector of transistor 28 is approximately 2.9 volts (one diode voltage drop below). Therefore, when the modulated RF signal is communicated from point T to point W through capacitor 26, the signal is referenced at 2.9 volts to have excursions above that level. Upon each negative excursion of the RF signal, the voltage at point W is limited to a value of 2.9 volts, since, at that voltage level, the transistor diode 28 is forward biased and conducts. When an RF signal starts its excursion in a positive direction from its negative peak, the transistor diode 28 is reverse biased and the signal level increases from the 2.9 volt level. It can be seen that the RF signal at point W establishes all the negative peaks of the RF signal to a constant voltage level, which in this case is approximately 2.9 volts. Therefore, a 2.0 volt peak to peak RF sensor output signal, while the timing disc 10 has segment 14 adjacent the ferrite core 16, and 1.90 volts peak to peak, while the lobe 12 is adjacent ferrite core 16, will appear as a 0.05 volt difference in amplitude between the upper peaks of the RF signal at T. However, at point W, the difference of voltage levels between the peaks will appear as 0.1 volts, while the lower peaks are at a constant level of 2.9 volts. The peak to peak height of the modulated RF signal is reflected at point W in the modulation of the upper peaks which are twice that which appear in the signal at point T.

An NPN transistor 34 is connected in an emitter follower configuration to provide a detector function to the amplitude modulation appearing on the upper peaks of the RF signal at point W. The detector also includes a diode voltage divider network made up of transistor diodes 36, 38 and 40 connected in series between the emitter of transistor 34 and the collector of an NPN transistor 45. The collector of transistor 34 is connected to the supply voltage and the emitter is connected to the base/collector of NPN transistor 36. The emitter of transistor 36 is connected to the emitter of PNP transistor 38. The base/collector of transistor 38 is connected to the emitter of PNP transistor 40 and the base/collector of transistor 40 is connected to the collector of transistor 45. The base of transistor 45 is connected to the base/collector of transistor 35 and the emitter of transistor 45 is connected to ground.

The aforementioned diode voltage divider network carries a current designated as $I_3$. The base of transistor 45 is connected to the base/collector of diode-connected transistor 35 in order to create a current mirror sink in the network. This provides that the current $I_3$ will be equal to the current $I_2$ flowing through transistor 35. The connection of transistors 34, 36, 38, 40 and 45 serve together as an upper envelope detector of the RF modulation and provide separate levels of the detected signal at designated points X, Y and Z at voltage levels separated by approximately 0.7 volts (the base to emitter voltage drop across respective diode-connected transistors).

A maximum peak detector is provided by a combination of NPN transistor 44, a current limiting resistor 48 and a storage capacitor 50. The transistor 44 has a collector connected to the 5 volt power supply, a base connected to point W and an emitter connected to resistor 48. The other side of resistor 48 is connected to one side of storage capacitor 50 and the other side of capacitor 50 is connected to ground. The positive peaks of the modulated RF signal cause transistor 44 to conduct and store charge in capacitor 50. After a few cycles of the disc 10, the capacitor 50 will have stored a charge equal to the maximum peak value found in the modulated signal and that charge level will correspond to that maximum value seen at point X. Due to the base/emitter voltage drop (approximately 0.7 volts) across the transistor 44, the peak voltage value stored in capacitor 50 is the same as that maximum seen at point X. Therefore, the 0.7 base/emitter voltage drop across transistor 34 in the detection network compensates for the 0.7 base/emitter voltage drop across the transistor 44. The voltage charge on capacitor 50 is sustained at an essentially constant maximum level when the input signal is less than the maximum peak because the paths backward through resistor 48 and the emitter of transistor 44, and forward into the base of a transistor 58 present very high impedance and a resultant long discharge time constant.

A minimum peak detector is provided by PNP transistor 42, a current limiting resistor 56 and a storage capacitor 54. In this case, the collector of transistor 42 is connected to ground, the base is connected to the collector of transistor 45 and the emitter is connected to resistor 56. The other side of resistor 56 is connected to storage capacitor 54 and the other side of storage capacitor 54 is connected to the 5 volt power supply. Each time the detected RF signal reaches a negative peak, transistor 42 turns on and allows capacitor 54 to accumulate charge. After a few cycles of the disc 10, the capacitor 54 will have stored the minimum peak value present in the detected signal and this value is the same as the minimum peak seen at point Z.

The automatic threshold level circuit is defined by an NPN transistor 58, a resistor 62, a resistor 66 and a PNP transistor 70. The collector of transistor 58 is connected to the 5 volt power supply; the base is connected to the maximum peak storage capacitor 50; and the emitter is connected to resistor 62. The other side of resistor 62 is connected to resistor 66 and the other side of resistor 66 is connected to the emitter of transistor 70. The base of transistor 70 is connected to the minimum peak storage capacitor 54; and the collector is connected to ground.

The values of the resistors 66 and 62 are selected so as to define a fractional threshold level between the maximum peak voltage level, as sensed by the maximum peak detector, and the minimum peak value, as sensed by the minimum peak detector. In the present embodiment, resistors 66 and 62 are selected to be equal in value so as to select the midpoint between the maximum and minimum peak values and correspond to the mid-level reference voltage at point Y. That level is illustrated in FIG. 3.

The voltage at the emitter of transistor 58 is the value of that stored in capacitor 50, less the base/emitter voltage drop of approximately 0.7 volts. In this case, the incremental voltage drop across diode-connected transistor 36 is employed to compensate for the incremental base/emitter voltage drop across NPN transistor 58 and therefore the voltage at the emitter of transistor 58 is equal to the highest peak seen at point Y.

Similarly, the voltage at the emitter of transistor 70 is the value of that stored in capacitor 54 less the approximately 0.7 volts incremental base/emitter voltage drop across transistor 70. The diode-connected transistor 38 is employed to incrementally compensate for the emitter/base voltage drop across PNP transistor 70 and the emitter voltage at the transistor 70 is equal to the lowest peak seen at point Y.

As illustrated in FIG. 3, the phase of the signal at point Y is the same as that present on the upper peaks of the RF signal and is opposite to the physical high/low profile of the rotating disc 10.

An essentially constant threshold level present at the junction between resistor 66 and 62 is fed to the positive input port of a comparator 68. The detected signal at point Y, at the junction of the emitters of transistors 36 and 38 is fed through a resistor 52 to the negative input port of the comparator 68, where it is compared with the threshold level on the positive input port. Therefore, whenever the detected cylical input signal increases to the threshold level, which is at a value midway between the maximum peak detected value and the minimum peak detected value, the comparator circuit 68 inversely switches between its two output voltage states in the manner similar to output signal "V", in FIG. 4. The output signal of comparator 68 changes from a high level state to a low level state whenever the detected signal traverses the threshold from a lower level to a higher level. The output states have been defined as "true" (V out) and "inverted" (V̄ out) with respect to the high and low lobes of the rotating member 10. The detected signal extant at "Y" and input to the negative port of comparator 68 is an inverse of the physical high/low profile of the rotating disc 10.

An inverter buffer circuit 72 provides an output signal designated as "V̄" and is shown in FIG. 5 as having its phasing correspond to that of the detected cyclical signal from the sensor, and inversely phased to the high (12) and low (14) lobes of the rotating member (10).

An inverter buffer circuit 74 is provided to re-invert the output and to provide phasing corresponding to the original profile of 10, shown in FIG. 4.

In comparison to the sensor input signal, it can be seen that the complimentary "V̄" and V waveforms have constant amplitude throughout, without regard to the extreme peak variations which may occur at the input signal.

Although the embodiment described above with respect to FIG. 1 is adequate to provide the improvements noted with respect to the prior art, it has been found that in some cases it may be desirable to provide a small amount of hysteresis in the switching points of the signal about the threshold level at the comparator 68. Such hysteresis is introduced by positive feedback from the output of the inverter 72 to the negative input port of comparator 68. A resistor 64 is connected between the output of inverter 72 and the emitter of a diode connected NPN transistor 60. The base/collector of the transistor 60 is connected to the negative input port of the comparator 68. The effect of the hysteresis circuit is to depress the signal at the negative input port of comparator 68 by about 20 millivolts, requiring the detected signal to traverse the threshold level by that amount before the output of the comparator 68 switches states. Since the minimum detected signal anticipated is at least 200 millivolts, the hysteresis corresponds to a maximum of only 10% of that signal. The effects of the hysteresis introduction has been found to provide greater stability at stall and sub-cranking speeds and provide a greater immunity to noise.

It will be apparent that many modifications and variations may be effective without departing from the scope of the novel concept of this invention. Therefore, it is intended by the appended claims to cover all such modifications and variations which fall in the true spirit and scope of this invention.

I claim:

1. A signal condition detection circuit with self-adjusting threshold, said circuit comprising:
   an oscillator for producing a first AC signal at a first frequency;
   means for amplitude modulating said first AC signal;
   means for demodulating said first amplitude modulated AC signal to produce a second cyclically varying signal corresponding to the peak to peak value of said amplitude modulation;
   means for sensing the maximum peak value of said second cyclically varying signal;
   means for sensing the minimum peak value of said second cyclically varying signal;
   means for generating a DC threshold signal having a voltage level bearing a predetermined relationship to both said sensed minimum and maximum peak values of said second cyclically varying signal; and
   means for generating an electrical output signal having a voltage level characteristic that changes from a first to a second predetermined voltage level whenever said second cyclically varying signal crosses said DC threshold level;
   whereby said DC threshold signal characteristic varies as a function of said sensed minimum and maximum values of said second cyclically varying signal.

2. A signal condition detection circuit as in claim 1, wherein said threshold signal generating means generates a signal having a level which is a predetermined fraction of the difference between the sensed maximum and minimum peak values.

3. A signal condition detection circuit as in claims 1 or 2, wherein said modulating means includes a variable-inductance rotary position sensor monitoring a cyclically varying flux field.

4. A signal condition detection circuit as in claim 2, wherein said modulating means produces cyclical peak to peak variations in said first AC signal to define a carrier envelope having upper and lower symetric variations according to said amplitude modulation and said demodulation means includes means for producing said second cyclically varying signal having peak to peak values identical to the variations produced by said modulating means.

5. In an ignition system for an internal combustion engine, utilizing a variable-inductance crank shaft position sensor with a multilobed timing disc connected to the crankshaft of said engine for synchronous rotation therewith and an oscillator connected to said sensor for generating a constant amplitude carrier frequency signal that is amplitude modulated by said sensor in accordance with said timing disc rotation, an improved circuit connected to said sensor for receiving said cyclically modulated carrier signal therefrom and generating an output signal that is an enhanced voltage replica of the modulation signal having constant high and low peak values, wherein said improved circuit includes:

demodulator means for receiving said cyclically modulated carrier frequency signal, referencing one of the highest and lowest peaks of said modulated carrier frequency signal at a predetermined voltage level and outputting a demodulation signal having peak to peak values corresponding to the peak to peak modulation difference values from said sensor;

first peak detection means for sampling the high peak values of said demodulation signals output from said demodulator means to derive a high peak voltage level;

second peak detection means for sampling the low peak values of said demodulation signal output from said demodulator means to derive a low peak voltage level;

voltage divider means connected between said first peak detection means and said second peak detection means to supply a threshold voltage level at a preselected fractional value between said high and low peak voltage levels;

comparator means having a first input port of one polarity connected to said voltage divider means to receive said threshold voltage level and a second input port of an opposite polarity connected to receive said demodulation signal, whereby the output of said comparator means switches between two distinct voltage levels, whenever the demodulated signal voltage level crosses the threshold voltage level, and said comparator output is said enhanced voltage replica of said modulation signal.

6. An ignition system as in claim 5, wherein said comparator means includes a feedback network to offset said threshold voltage level and said demodulation signal by a predetermined amount in order to insure that said comparator means switches when said demodulation signal traverses said threshold voltage level by said predetermined amount.

* * * * *